June 6, 1961 A. G. GATFIELD ET AL 2,987,574

SYSTEM FOR SYNCHRONIZING A PULSE WITH A CARRIER WAVE

Filed April 30, 1959 2 Sheets-Sheet 1

Inventors:
Allen G. Gatfield,
Richard E. Thoman,
by Gust & Irish
Attorneys.

SYSTEM FOR SYNCHRONIZING A PULSE WITH A CARRIER WAVE

Filed April 30, 1959 2 Sheets-Sheet 2

Inventors:
Allen G. Gatfield,
Richard E. Thoman,
by Gust & Irish
Attorneys.

United States Patent Office 2,987,574

Patented June 6, 1961

2,987,574

SYSTEM FOR SYNCHRONIZING A PULSE WITH A CARRIER WAVE

Allen G. Gatfield, Fort Wayne, Ind., and Richard E. Thoman, San Diego, Calif., assignors to International Telephone and Telegraph Corporation Filed Apr. 30, 1959, Ser. No. 810,117
10 Claims. (Cl. 178—69.5)

This invention relates generally to carrier transmission systems in which a periodically recurring synchronizing or blanking pulse is impressed on a carrier wave, and more particularly to a system for synchronizing the trailing edge of a pulse with a low frequency carrier.

The video signal provided by conventional television camera apparatus employing conventional scanning rates has a band width sufficiently broad to preclude its transmission over conventional telephone lines. There are instances, however, in which it is desirable to transmit a television video signal over narrow band transmission facilities, such as conventional telephone lines, and various slow scanning camera apparatus has been devised for providing the requisite narrow band video signal. Although some narrow band television systems have been proposed which do not employ a carrier transmission system, the non-linear phase response of commercial narrow band transmission facilities, together with the D.C. and low frequency components in the narrow band video signal indicates the desirability of employing carrier transmission, i.e., modulating a carrier frequency with the video signal; the band width limitations of narrow band transmission facilities, however, in turn necessitates that a low frequency carrier be employed.

In the transmission of any televisional signal, it is necessary to transmit synchronizing pulses for the line sweeps, these synchronizing pulses and the frequency of the carrier generally not having a fixed phase relationship. In the case of narrow band television transmission, it is necessary that the line sweep synchronizing or blanking pulses be transmitted with a high degree of accuracy in order to obtain optimum resolution. When synchronizing pulses having a PRF which is not locked or fixed with respect to the frequency of the carrier are impressed on a carrier, the transmission accuracy of the pulses is limited to one-half cycle of the carrier frequency. This error in transmission has little practical effect with a high frequency carrier and can thus be safely ignored. However, in the case of a low frequency carrier, an error of one half cycle of the carrier frequency represents appreciable time and thus produces a visible degradation of the output of the picture in the form of misalignment which is particularly observable as smear. It is therefore desirable to improve the transmission accuracy of line synchronizing pulses impressed on a low frequency carrier and we have found that this can be accomplished by synchronizing the end or trailing edge of each blanking pulse (the start of the line sweep) with the carrier wave in such manner that the trailing edge of the blanking pulse bears a fixed phase relationship with the carrier. Thus, by providing variable duration blanking pulses with the end of each blanking pulse having a fixed phase relationship with the carrier, the transmission delays are held constant and accurate registration of the output picture is provided.

It is accordingly a general object of our invention to provide a system for synchronizing a pulse with a carrier wave.

Another object of our invention is to provide a system for synchronizing the trailing edge of a pulse with a carrier wave.

Our invention, therefore, in its broader aspects provides a first input circuit for receiving a carrier and means for providing a train of pulses respectively in time coincidence with predetermined polarity half cycles of the carrier. Another input circuit is provided for receiving the synchronizing signals and gating means are provided for passing the train of pulses responsive to reception of a synchronizing signal. Means are provided for initiating the pulse to be synchronized with the carrier responsive to the synchronizing signal, the pulse initiating means including time constant means for respectively terminating the pulses after a predetermined time delay. Our system further provides means for superimposing the train of pulses passed by the gating means on the time constant means so that the pulse to be synchronized is terminated prior to the predetermined fixed time delay responsive to one of the train of pulses which, as previously indicated, is in time coincidence with a carrier half cycle.

The above-mentioned and other features and objects of this invention and the manner of attaining them will become more apparent and the invention itself will be best understood by reference to the following description of an embodiment of the invention taken in conjunction with the accompanying drawings, wherein.

Figure 2:
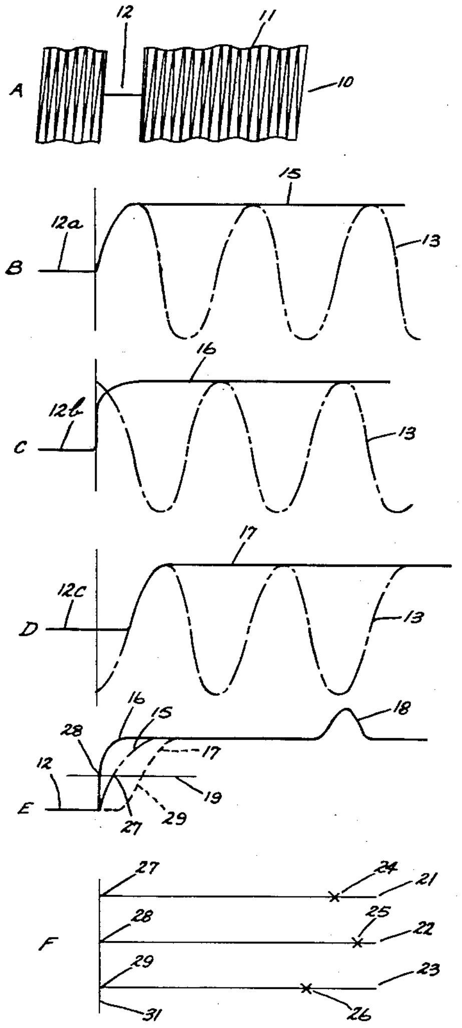
FIG. 2 are waveforms illustrating the lack of transmission accuracy occasioned by impressing synchronizing pulses on a low frequency carrier and the resulting misalignment of the output picture.

Referring initially to FIG. 2(A) of the drawing, a relatively high frequency carrier is shown at 10 having a modulation envelope 11 and with a synchronizing or blanking pulse 12 impressed thereon effectively terminating the carrier during the period of the pulse; it will be readily understood that the PRF of the blanking pulses 12 need have no fixed phase relationship with the carrier frequency 10, i.e., the effect on the modulation envelope 11 due to the point in each cycle of carrier 10 at which blanking pulse 12 is terminated is obviously negligible. Referring now to FIGS. 2(B) through (F), however, it will be seen that in the case of a low frequency carrier 13, the point at which blanking pulse 12 is terminated with reference to the phase of the carrier 13 becomes extremely important. Thus, in FIG. 2(B), the blanking pulse 12 is shown as terminating coincident with passage of the carrier wave 13 through zero going positive, and thus, the detected modulation envelope 15 will have a configuration as shown. In FIG. 2(C), however, the blanking pulse 12 is shown as being terminated when the carrier wave 13 is at a positive maximum thus providing a detected modulation envelope configuration as shown at 16. Likewise, in FIG. 2(D), the blanking pulse 12 is shown as terminating when the carrier wave 13 is at a negative maximum, thus providing a detected modulation envelope having a configuration as shown at 17. The three detected modulation envelopes 15, 16 and 17 are shown together in FIG. 2(E), and thus could represent three successive line sweeps in a narrow band television transmission system. Here, it is assumed that the detected modulation envelopes 15, 16 and 17 have a peak 18 as shown which should, in the case of successive scannings provide a vertical line in the output picture. It is further assumed that the scanning circuitry in the receiving apparatus has a threshold level as shown by the line 19 in FIG. 2(E), i.e., the voltage level of the detected video signal which will initiate a scanning line. Referring now additionally to FIG. 2(F), it is assumed that termination of blanking pulse **12*a* initiates a scanning line 21 so that peak 18 in detected video signal 15 will provide a visible spot 24** on the screen, that termination of blanking pulse 12*b* initiates scanning line 22 with peak 18 in detected video signal 16 providing spot 25 and likewise the termination of blanking pulse 12*c* will initiate scanning line 23 with peak 18 in detected video signal 17 providing spot 26. Assuming now, as indicated, that the peaks 18 in the detected video signals 15, 16 and 17 are provided by a vertical line in the transmitted picture, it is obvious that a vertical line in should appear in the resulting output picture. However, it will be seen, with particular reference to FIG. 2(E), that scanning line 21 will be initiated at point 27, i.e., when detected video signal 15 crosses threshold level 19, scanning line 22 will be initiated at point 28 when detected video signal 16 crosses threshold level 19, and finally that scanning line 23 will be initiated at point 29 when detected video signal 17 crosses threshold level 19. Each of the scanned lines 21, 22 and 23 on the output cathode ray tube begins at a fixed physical point falling along a fixed vertical line 31 as shown in FIG. 2(F), however, and thus it will now be comprehended that because of the difference in time at which each of the scanning lines 21, 22 and 23 was initiated caused by the difference in the phase relationship between the blanking pulses 12*a*, *b* and *c* with respect to the carrier 13, signals 24, 25 and 26 will not appear a vertical line, thus providing the resulting misalignment or "smear" in the picture.

Figure 1:
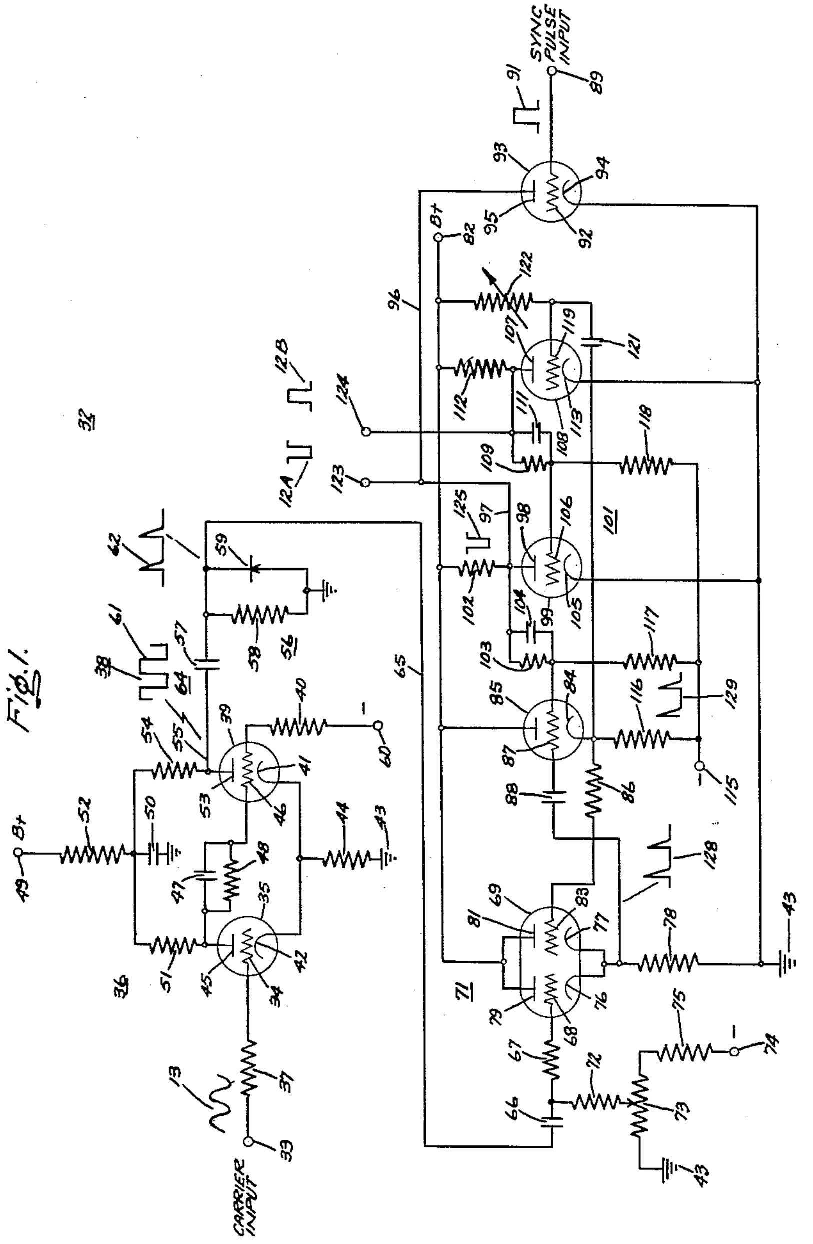
FIG. 1 is a schematic illustration showing the preferred embodiment of our invention.

Referring now to FIG. 1, our system for synchronizing the trailing edge of the blanking pulses with the carrier shown generally at 32, includes an input terminal 33 adapted to be connected to the source of the low frequency carrier 13. Carrier input terminal 33 is connected to control grid 34 of tube 35 of bistable multivibrator 36 by means of coupling resistor 37. Bistable multivibrator 36 which serves to square the carrier 13, as at 38, includes a second tube 39 with its cathode 41 and cathode 42 of tube 35 connected together and to ground 43 by a common cathode resistor 44. Plate 45 of tube 35 is coupled to control grid 46 of tube 39 by a suitable capacitor 47 having resistor 48 connected thereacross. Control grid 46 of tube 39 is also connected to a source 60 of suitable negative potential, such as —150 volts, by resistor 40. Plate 45 of tube 35 is connected to a suitable source 49 of positive plate potential, such as 300 volts, by plate resistors 51 and 52 with plate 53 of tube 39 likewise being connected to the source 49 of positive plate potential by plate resistors 54 and 52. The end of resistor 52 to which resistors 51 and 54 are connected is connected to ground by capacitor 50. The ouput of bistable multivibrator 36 is in accordance with conventional practice taken from plate 53 of tube 39. It will be readily understood that the specific circuitry of the bistable multivibrator 36 does not form a part of our invention and that other suitable squaring circuits may equally be advantageously employed in our invention.

The output circuit 55 of bistable multivibrator 36 is coupled to differentiating and clipping circuit 56 including a series capacitor 57, and resistor 58 and diode 59 connected to ground as shown, as is well known in the art. Thus, the positive-going half cycles 61 of the squared wave 38 provided by the bistable multivibrator 36, which are in time coincidence with the sinusoidal carrier wave 13, are differentiated to provide a train of positive going differentiated pulses 62, it being readily understood that the differentiated negative going pulses resulting from the negative going pulses 64 of the squared wave 38 are clipped by the clipping diode 59. It will now be readily comprehended that the positive going differentiated pulses 62 are essentially in time coincidence with the leading edge of the positive going squared pulses 61, and thus in turn are essentially in time coincidence with the passage of the sinusoidal carrier wave 13 through zero going positive. Again it will be readily understood that other specific forms of differentiating and clipping circuits may be readily employed in our system.

It will now be readily comprehended that the sinusoidal carrier wave 13 is, in accordance with the system of our invention, first squared and then differentiated and clipped in order to provide a train of identical pulses in time coincidence with the carrier which do not change their size or shape responsive to a change in frequency of the carrier; a change in frequency of the carrier 13 will merely result in a change of the PRF of the train of differentiated and clipped pulses 62.

The train of differentiated and clipped pulses 62 is coupled by line 65, coupling capacitor 66 and coupling resistor 67 to control grid 68 of tube 69 which in combination with other circuitry now to be described forms a double cathode follower gate circuit 71. Here it is seen that control grid 68 of tube 69 is provided with suitable bias, and also that base clipping of the differentiated train of pulses 62 is provided by resistor 72 having one end connected between capacitor 66 and resistor 67 and its other end connected to the sliding element of potentiometer 73 which in turn has one end connected to a suitable source 74 of negative potential, such as —150 volts, by resistor 75 and which has its other end connected to ground 43, as shown. As is well understood in the art, a double cathode follower gate circuit includes two elements, shown here as being a single dual triode 69 with cathodes 76 and 77 of the two tube elements being connected together and to ground 43 by a common cathode resistance 78. Plates 79 and 81 of tube 69 are likewise connected together and connected to a suitable source 82 of positive plate potential, such as 300 volts. Control grid 83 of the double cathode follower gate circuit 71 is connected to cathode 84 of tube 85 by resistor 86 and likewise, cathodes 76 and 77 of tube 69 of gate circuit 71 are coupled to control grid 87 of tube 85 by coupling capacitor 88, the functioning of these connections being hereafter more fully described.

A synchronizing pulse input terminal 89 is provided adapted to be connected to the source of synchronizing pulses 91 and connected to control grid 92 of trigger tube 93. Cathode 94 of trigger tube 93 is connected to ground 43, as shown, and its plate 95 is connected by conductors 96 and 97 and resistor 102 to source 82 of positive plate potential. Plate 98 of tube 99 of multivibrator 101 is likewise connected to source 82 of positive plate potential by plate resistor 102 and to control grid 87 of tube 85, which forms a part of a cathode follower circuit, by coupling resistor 103 and capacitor 104. Cathode 105 of tube 99 is connected to ground 43 as shown.

Control grid 106 of tube 99 of monostable multivibrator 101 is coupled to plate 107 of the other tube 108 of multivibrator 101 by coupling resistor 109 and capacitor 111. Plate 107 of tube 108 is connected to the positive source 82 of plate potential by a resistor 112 and cathode 113 is connected to ground 43 as shown.

Cathode 84 of cathode follower tube 85 is connected to a suitable source 115 of negative potential, such as —150 volts, by cathode resistor 116 and control grid 87 of tube 85 is likewise connected to negative source of potential 115 by resistor 117. Control grid 106 of tube 99 of multivibrator 101 is also connected to negative source of potential 115 by resistor 118. Cathode 84 of cathode follower tube 85 is connected to control grid 119 of tube 108 of multivibrator 101 by capacitor 121, control grid 119 likewise being connected to a positive source of plate potential 82 by a suitable variable resistance 122; it will immediately be recognized that capacitor 121 and resistor 122 constitute a time constant holding circuit which determines the period of multivibrator 101. Negative-going blanking pulses 12*a* are obtained from multivibrator 101 from output terminal 123 coupled to plate 98 of tube 99 while positive-going blanking pulses 12*b* are provided by output terminal 124 connected to plate 107 of tube 108 of multivibrator 101.

In operation, and in the absence of synchronizing pulse 91, trigger tube 93 is normally non-conducting, tube 108 of multivibrator 101 is normally conducting, tube 99 is normally non-conducting, cathode follower tube 85 is normally conducting with the section of tube 69 formed by cathode 77, control grid 83 and plate 81 normally conducting and the section formed by the cathode 76, control grid 68 and plate 79 being non-conducting, as will be hereinafter more readily apparent. It is thus seen that with the section of tube 69 formed by cathode 76, control grid 68 and plate 79 non-conducting, the gate circuit is "closed" and thus the train of differentiated pulses 62 in time coincidence with the carrier 13 will not be passed to the multivibrator 101. Assuming now that a positive going synchronizing pulse 91 is impressed on sync pulse input terminal 89 and thus on control grid 92 of tube 93, positive-going sync pulse 91 drives control grid 92 of tube 93 positive, thus causing tube 93 to conduct. This flow of plate current from tube 93 and plate resistor 102 produces a corresponding negative-going pulse across resistor 102 which is D.C. coupled to grid 87 of cathode follower tube 85 by resistor 103 and capacitor 104; negative going pulse 125 which appears across plate resistor 102 thus drives control grid 87 of cathode follower tube 85 to a state of reduced conduction, thus reducing the flow of plate current in tube 85. Prior to such reduced conduction responsive to sync pulse 91, tube 85 had been conducting thus providing a substantial potential drop across cathode resistor 116, this voltage being coupled to control grid 83 of tube 69 by resistors 86 thus causing the section of tube 69 formed by cathode 77, control grid 83 and plate 81 to conduct. This conduction between cathode 77 and plate 81 of tube 69 produced a corresponding potential drop across cathode resistor 78 sufficient to raise cathode 76 to a sufficiently high potential to cut off the tube section formed by cathode 76, control grid 68 and plate 79 thereby blocking the differentiated pulses 62.

Impression of negative going pulse 125 responsive to positive going sync pulse 91 on control grid 87 of cathode follower tube 85 reduces the flow of plate current in tube 85 thus providing a drastic reduction in the potential drop across cathode resistor 116, this reduction in cathode potential being in turn impressed on control grid 83 of tube 69 cutting off the flow of plate current between cathode 77 and plate 81. This cutting off of plate current of tube 69 in turn reduces the potential drop across cathode resistor 78 thus reducing the potential of cathode 76 and thus permitting differentiated pulses 62 to be passed by tube 69 appearing as corresponding positive-going pulses across cathode resistor 78.

Figure 3:
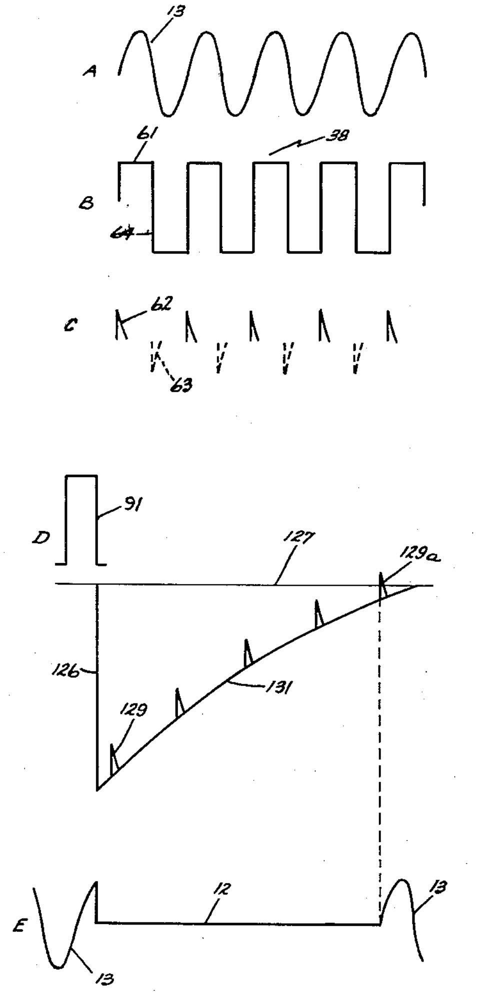
FIG. 3 are waveforms of signals found in the improved system of our invention.

Reducing of the conduction of cathode follower tube 85 by the negative-going pulse 125 responsive to the positive-going sync pulse 91 and the corresponding sudden reduction in the potential across cathode resistor 116 also couples through capacitor 121 as shown at 126 in FIG. 3(D) with control grid 119 of tube 108 being made correspondingly negative thus cutting off the flow of plate current in tube 108. Cutting off the flow of plate current in tube 108 of multivibrator 101 thus reduces the potential drop across plate resistor 112, thus producing a corresponding increase in the potential of plate 107. It will now be seen that impression of the sync pulse 91 on trigger tube 92 has provided the leading edge of negative-going blanking pulse 12A at output terminal 123 and also the leading edge of positive-going blanking pulse 12B at output terminal 124.

Increase in the potential of plate 107 of multivibrator tube 108 responsive to cutting off of tube 108 is impressed on control grid 106 of tube 99 thus turning tube 99 on, as is well understood in the art. It will further be readily comprehended that capacitor 121 and resistor 122 constitute a time constant holding circuit for multivibrator 101, the rate of charge of capacitor 121 being determined by its value and the value of resistor 122, capacitor 121 holding control grid 119 of tube 108 sufficiently negative to maintain multivibrator 101 in the "flipped" condition until capacitor 121 has charged to a predetermined potential level, as indicated at 127 in FIG. 3(D). Thus, when control grid 119 of tube 108 reaches potential 127, tube 108 will fire, thus providing a heavy flow of plate current in plate resistor 112 and a consequent substantial voltage drop thereacross, thus lowering the potential of plate 107. This sudden decrease in potential is coupled to grid 106 of tube 99 thus cutting-off that tube providing a sudden increase in the potential of its plate 98. It is thus seen that turning on of tube 108 and simultaneous cutting off of tube 99 provides the trailing edge of blanking pulse 12A in output terminal 123 and likewise the trailing edge of blanking pulse 12B at output terminal 124.

Merely providing a fixed time delay for terminating the blanking pulses 12A and/or 12B is not sufficient, however, since there would still be no synchronization between the trailing edge of pulses 12A and 12B and the carrier 13. However, it has been seen that negative going pulse 125 responsive to the sync pulse 91 which initiated blanking pulses 12A and 12B by flipping multivibrator 101 also turned on gate circuit 71, i.e., permitted the section of tube 61 formed by cathode 76, control grid 68 and plate 79 to conduct. The differentiated pulses 62 thus, during the "flipped" condition of multivibrator 101, appear across cathode resistor 78 of the double cathode follower gate circuit 71 and are impressed on control grid 87 of cathode follower tube 85. Cathode follower tube 85 is, during the duration of the "flipped" condition of multivibrator 101, normally maintained at reduced conduction due to the cut-off condition of tube 99, however, the positive going pulses 128 appearing across cathode resistor 78 of tube 69 responsive to differentiated pulses 62 periodically drive tube 85 into increased conduction so that corresponding positive going pulses 129 appear across cathode resistor 116 of cathode follower 85, these positive going pulses 129 in time coincidence with the differentiated pulses 62 and the carrier 13 being superimposed on the charge characteristic 131 of capacitor 121 as seen in FIG. 3(D).

It will now be seen that during the charging of capacitor 121, a number of positive-going pulses 129 are superimposed on the charging characteristic 131 and that finally, a superimposed pulse **129*a* will momentarily reach a potential above level 127, thus sufficiently increasing the potential of grid 119 of tube 108 to cause that tube to conduct, this initiation of conduction which, as explained above, provides the trailing edge or termination of blanking pulse 12 being thus in time coincidence with a differentiated pulse 62 and in turn in time coincidence with passage of the carrier wave 13 through zero going positive. It will thus be readily apparent that it is necessary that the amplitude of pulses 129 which are superimposed on the charge characteristic 131 of capacitor 121 be higher than the rise of the capacitor potential between successive pulses 129**.

It will now be seen by additional reference to FIG. 3(E), that carrier 13 is terminated, i.e., blanked by blanking pulse 12, blanking pulse 12 being terminated, thus in turn again initiating carrier 13 responsive to a pulse 129 which is in turn in time coincidence with the differentiated pulse 62, pulses 62 being in time coincidence with the passage of carrier 13 through zero going positive. It is thus seen that the approximate duration of the blanking pulse 12 is established by the parameters of timing capacitor 121 and resistor 122, the exact termination of blanking pulse 12 being provided responsive to a differentiated pulse 62 which is in time coincidence with the carrier 13 passing through zero going positive. It will now be apparent that in accordance with our invention, a synchronizing or blanking pulse is terminated, thus initiating a line sweep with the same phase relationship to the carrier for each line sweep, thus eliminating the misalignment of the resulting output picture. It will be readily understood that by so fixing the beginning of each line sweep, the termination or end of each line sweep provided by the leading edge of each blanking pulse 12 will vary, this variation however appearing at the end of the line and being of no consequence.

It will now be readily seen that the double triode bistable multivibrator 36 is shown as being of the Schmidt or cathode-coupled type. It will further be readily comprehended that the cathode follower circuit including tube 85 and cathode resistance 116 is employed as an impedance matching device to speed up the action of the main monostable multivibrator 101 comprising tubes 99 and 108.

In an actual circuit incorporating our invention, components having the following values were employed:

| | |
|---|---|
| Tube 35 | ½–12AT7 |
| Resistor 37 ohms | 100,000 |
| Tube 39 | ½–12AT7 |
| Resistor 40 megohms | 1 |
| Resistor 44 ohms | 1,000 |
| Capacitor 47 microfarads | 22 |
| Resistor 48 megohms | 1.5 |
| Capacitor 50 microfarads | 20 |
| Resistor 51 ohms | 27,000 |
| Resistor 52 do | 10,000 |
| Resistor 54 do | 27,000 |
| Capacitor 57 microfarads | 100 |
| Resistor 58 ohms | 10,000 |
| Diode 59 | IN38A |
| Capacitor 66 microfarads | 1,000 |
| Resistor 67 ohms | 220 |
| Tube 69 | 12AT7 |
| Resistor 72 ohms | 470,000 |
| Potentiometer 73 do | 2,500 |
| Resistor 75 do | 15,000 |
| Resistor 78 do | 47,000 |
| Tube 85 | ½–12AT7 |
| Resistor 86 ohms | 220 |
| Capacitor 88 microfarads | 220 |
| Tube 93 | ½–12AT7 |
| Tube 99 | ½–12AT7 |
| Resistor 102 ohms | 27,000 |
| Resistor 103 do | 470,000 |
| Capacitor 104 microfarads | 47 |
| Tube 108 | ½–12AT7 |
| Resistor 109 megohms | 1.8 |
| Capacitor 111 microfarads | 150 |
| Resistor 112 ohms | 30,000 |
| Resistor 116 do | 47,000 |
| Resistor 117 do | 330,000 |
| Resistor 118 megohms | 2.2 |
| Capacitor 121 microfarads | .01 |
| Resistor 122 megohms | 1.5 |

It will now be seen that our improved circuit provides a fixed time delay in the transmission of synchronizing or blanking pulses in which the trailing edge of the blanking time always occurs in a fixed phase relationship to the carrier. It will be seen that the carrier frequency is, in accordance with our invention, shaped into a sharp pulse which occurs at the positive zero crossing of the carrier sine wave, these pulses being gated into the line blanking multivibrator during the occurrence of the blanking pulse, i.e., the gate circuit allows the train of pulses coincident with the carrier sine wave to affect the line blanking multivibrator only during the retrace or blanking time. It will be seen that the line blanking multivibrator is a monostable unit which is triggered at the end of each line sweep by the input line timing or sync pulses, the blanking time being generally set by the time constant of the monostable multivibrator with the exact time being set by the pulses coincident with the carrier. It is thus seen that since the carrier has no fixed relationship to the line rate, the blanking time will be variable, continually changing, as the two rates drift in relation to each other. It will be observed, however, that importantly, the end of each line blanking, which is the start of a new line sweep, is always locked in synchronism with the carrier phase and is thus transmitted to a remote receiving circuit with a constant time delay with the end result that the picture at the receiving end is an accurate registration.

While we have described above the principles of our invention in connection with specific apparatus, it is to be clearly understood that this description s made only by way of example and not as a limitation to the scope of our invention.

What is claimed is:

1. A system for synchronizing the trailing edge of a first pulse and a carrier wave comprising: a first input circuit for receiving said carrier; means coupled to said first input circuit for providing a train of second pulses respectively in time coincidence with predetermined polarity half cycles of said carrier; a second input circuit for receiving synchronizing signals; monostable delay multivibrator means coupled to said second input circuit and triggered responsive to said synchronizing signals for respectively initiating said first pulses, said multivibrator means including a capacitance-resistance time constant holding circuit for terminating said first pulse after a predetermined time delay; gating means coupled to said means for providing second pulses and to said multivibrator means, said gating means being gated-on by the leading edge of a first pulse and gated-off by the trailing edge thereof thereby to pass a train of said second pulses during each said first pulse, said gating means being coupled to said time constant circuit so that said second pulses passed by said gating means are superimposed on said capacitor whereby a said first pulse is terminated prior to expiration of said time delay responsive to a said second pulse.

2. A system for synchronizing the trailing edge of a first pulse and a carrier wave comprising: a first input circuit for receiving said carrier; means coupled to said first input circuit for providing a train of second pulses respectively in time coincidence with predetermined polarity half cycles of said carrier; a second input circuit for receiving synchronizing signals; a monostable delay multivibrator circuit including a pair of valve devices for providing said first pulses, said multivibrator circuit being coupled to said second input circuit and triggered responsive to said synchronizing signals for respectively initiating said first pulses; a cathode follower circuit including a valve device coupled between an output element of one of said multivibrator circuit valve devices and a control element of the other of said multivibrator circuit valve devices and including a time constant holding capacitor connected in series with said control element whereby said first pulses are respectively terminated after a predetermined time delay; a gating circuit coupled to said means for providing second pulses and to said multivibrator circuit and gated open responsive to each first pulse for passing a train of said second pulses during each said first pulse, said gating circuit being coupled to said cathode follower circuit so that said second pulses passed by said gating circuit are superimposed on said capacitor whereby a said first pulse is terminated prior to expiration of said time delay responsive to a said second pulse.

3. A system for synchronizing the trailing edge of a first pulse and a carrier wave comprising: a first input circuit for receiving said carrier; means coupled to said first input circuit for providing a train of second pulses respectively in time coincidence with predetermined polarity half cycles of said carrier; a second input circuit for receiving synchronizing signals; a monostable delay multivibrator circuit including a pair of valve devices for providing said first pulses, said multivibrator circuit being coupled to said second input circuit and triggered responsive to said synchronizing signals for respectively initiating said first pulses respectively; a cathode follower circuit including a valve device having a control element coupled to one output element of one of said multivibrator circuit valve devices and a cathode element coupled to a control element of the other of said multivibrator circuit valve devices by a capacitor; a resistor coupled to said capacitor and forming a time constant holding circuit therewith for said multivibrator circuit whereby said first pulses are respectively terminated after a predetermined time delay; a double cathode follower gate circuit having a pair of valve devices, the control element of one of said gate circuit control devices being coupled to said means for providing second pulses and the control element of the other of said gate circuit valve devices being coupled to said cathode element of said cathode follower circuit whereby said gate circuit is gated open responsive to each first pulse to pass a train of said second pulses during each said first pulse, the cathode elements of said gate circuit valve devices being coupled to said control element of said cathode follower control device so that said second pulses passed by said gate circuit are superimposed on the charging characteristic of said capacitor whereby a said first pulse is terminated prior to expiration of said time delay responsive to a said second pulse.

4. A system for synchronizing the trailing edge of a first pulse and a carrier wave comprising: a first input circuit for receiving said carrier; a bistable multivibrator circuit coupled to said first input circuit for squaring said carrier wave; a differentiating and clipping circuit coupled to said bistable multivibrator circuit for providing a train of differentiated second pulses respectively in time coincidence with predetermined polarity half cycles of said carrier; a second input circuit for receiving synchronizing signals; a monostable delay multivibrator circuit including a pair of valve devices and an output circuit for providing said first pulses; said monostable multivibrator circuit being coupled to said second input circuit and triggered responsive to said synchronizing signals for respectively initiating said first pulses; a cathode follower circuit including a valve device having a control element coupled to one output element of one of said monostable multivibrator circuit valve devices and a cathode element coupled to a control element of the other of said monostable multivibrator circuit valve devices by a capacitor; a resistor coupled to said capacitor and forming a time constant holding circuit therewith for said monostable multivibrator circuit whereby said first pulses are respectively terminated after a predetermined time delay; a double cathode follower gate circuit having a pair of valve devices, the control element of one of said gate circuit control devices being coupled to said differentiating and clipping circuits and the control element of the other of said gate circuit valve devices being coupled to said cathode element of said cathode follower circuit whereby said gate circuit is gated open responsive to each first pulse to pass a train of said second pulses during each said first pulse, the cathode elements of said gate circuit valve devices being coupled to said control element of said cathode follower control device so that said second pulses passed by said gate circuit are superimposed on the charging characteristic of said capacitor whereby a said first pulse is terminated prior to expiration of said time delay responsive to a said second pulse.

5. A system for synchronizing the trailing edge of a first pulse in a carrier wave comprising: first input circuit means for receiving said carrier; means for providing a train of second pulses respectively in time coincidence with predetermined polarity half cycles of said carrier; second input circuit means for receiving synchronizing signals; means coupled to said second input circuit means and responsive to said synchronizing signals for respectively initiating said first pulses, said pulse initiating means including time constant means for respectively terminating said first pulses after a predetermined time delay; gating means coupled to said means for providing said second pulses and to said pulse initiating means and opened responsive to each said first pulse for passing a train of said second pulses during each first pulse; and means coupling said gating means and said time constant means for superimposing said second pulses passed by said gating means on said time constant means whereby a said first pulse is terminated responsive to a second pulse prior to the end of said period.

6. The system of claim 5 wherein said time constant means includes a capacitor, said capacitor being discharged responsive to initiation of a first pulse and subsequent recharge of said capacitor terminates said first pulse; and wherein said second pulses passed by said gating means are superimposed on the charging characteristic of said capacitor whereby said capacitor is charged responsive to a said second pulse thereby to terminate a respective first pulse.

7. The system of claim 5 wherein said second pulses are positive-going; wherein said time constant means includes a capacitance-resistance time constant circuit, said capacitor being discharged and driven negative responsive to initiation of a said first pulse and subsequent recharge of said capacitor through said resistance to a predetermined level terminates said first pulse, and wherein said positive-going second pulses passed by said gating means are superimposed upon the charging characteristic of said capacitor whereby said capacitor is charged to said predetermined level responsive to a said positive-going second pulse thereby to terminate the respective first pulse prior to the end of said predetermined period.

8. The system of claim 5 wherein said means for providing a train of second pulses includes differentiating and clipping means whereby said second pulses are respectively differentiated.

9. The system of claim 5 wherein said means for providing second pulses includes means coupled to said first input circuit for squaring said carrier wave, and differentiating and clipping means coupled to said squaring means whereby said second pulses are respectively differentiated.

10. A system for synchronizing the trailing edge of a first pulse and a carrier wave comprising: a first input circuit for receiving said carrier; means coupled to said first input circuit for providing a train of second pulses respectively in time coincidence with predetermined polarity half cycles of said carrier; a second input circuit for receiving synchronizing signals; monostable delay multivibrator means coupled to said second input circuit and triggered responsive to said synchronizing signals for respectively initiating said first pulses, said multivibrator means including a capacitance-resistance time constant holding circuit for respectively terminating said first pulses after a predetermined time delay; and gating means coupled to said means for providing second pulses and to said multivibrator means and opened responsive to each first pulse for passing a train of said second pulses during each first pulse; said gating means being coupled to said time constant circuit so that said second pulses passed by said gating means are superimposed on said capacitor whereby a said first pulse is terminated responsive to a said second pulse prior to expiration of said time delay.

References Cited in the file of this patent

UNITED STATES PATENTS

| | | |
|---|---|---|
| 2,693,531 | Cope et al. | Nov. 2, 1954 |
| 2,883,449 | Eilers et al. | Apr. 21, 1959 |